June 26, 1956  W. J. JOSEPH  2,752,401
MANUFACTURE OF CHLORINATED HYDROCARBONS
Filed Oct. 6, 1950
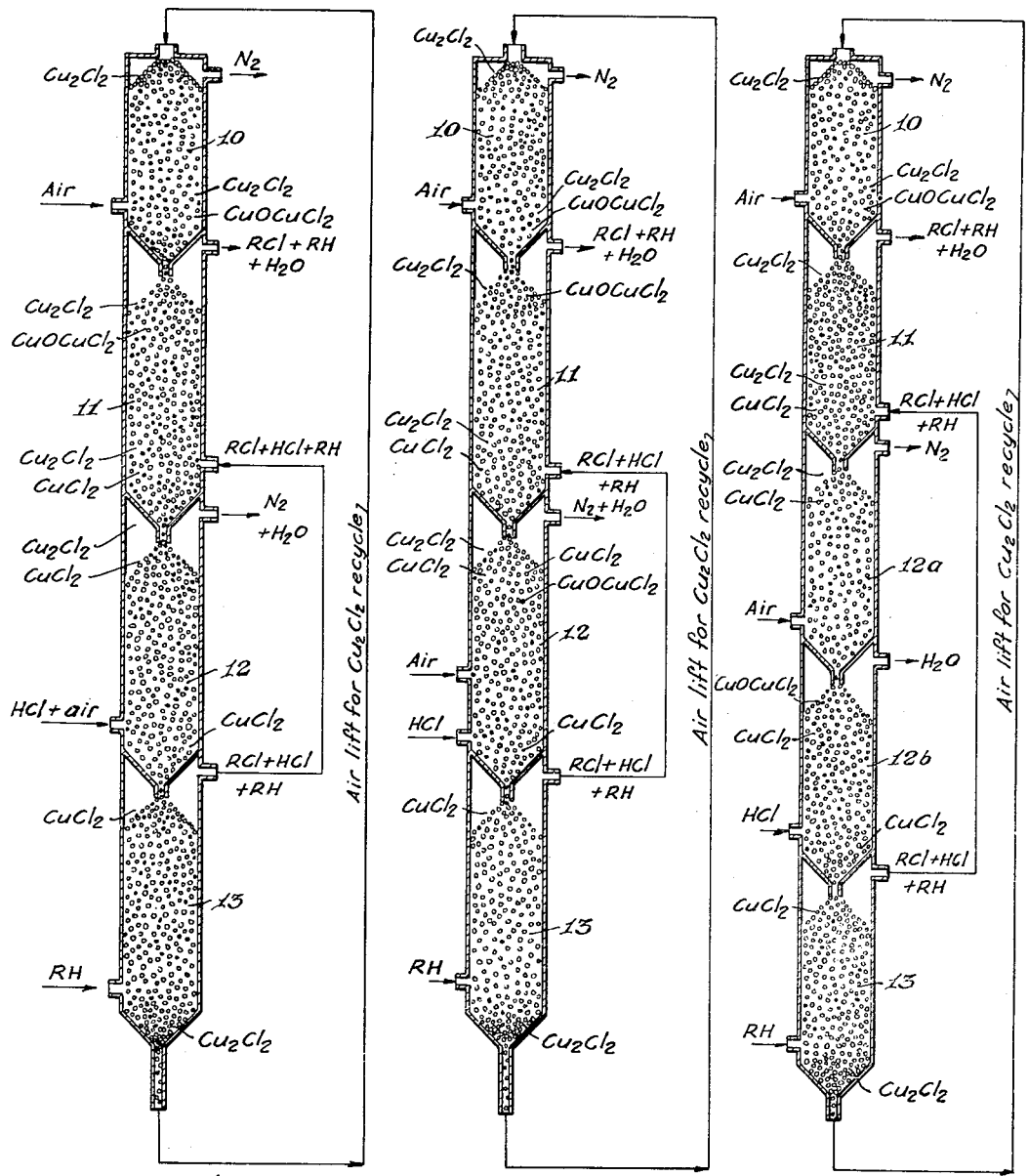
INVENTOR
WILLIAM J. JOSEPH, DECEASED,
ADOLPHUS B. BIANCHI,
ADMINISTRATOR
BY
Griswold & Burdick
ATTORNEYS

United States Patent Office 2,752,401
Patented June 26, 1956

2,752,401

MANUFACTURE OF CHLORINATED HYDROCARBONS

William J. Joseph, deceased, late of Pittsburg, Calif., by Adolphus B. Bianchi, administrator, San Francisco, Calif., assignor to The Dow Chemical Company, Midland, Mich., a corporation of Delaware Application October 6, 1950, Serial No. 188,666

6 Claims. (Cl. 260—659)

This invention relates to a method and apparatus for the continuous oxychlorination of hydrocarbons. It relates as well to the oxychlorination of the volatile and less than fully chlorinated substitution products of such hydrocarbons.

The term "oxychlorination" is used herein as elsewhere in the art to refer to a reaction in which the source of chlorine employed for the chlorination reaction is gaseous hydrogen chloride which is made to give up its chlorine in useful form through a well known series of reactions involving oxygen and copper chlorides or the chlorides of other metals of variable valence. Numerous such reactions for the generation of chlorine from hydrogen chloride have long been known. The Deacon Process, for example, was proposed for the oxidation of hydrogen chloride with air over a fixed body of copper chlorides which functioned catalytically. One disadvantage of the Deacon Process, when applied to the chlorination of hydrocarbons as well as when used merely for the production of chlorine, arose from the decreasing effectiveness of the catalyst mass which had to be replaced and regenerated. Several improvements and modifications have been made in the original Deacon Process and many of these have been applied to the oxychlorination of such diverse hydrocarbons and hydrocarbon derivatives as methane, ethane, ethylene, some of the chloroethylenes and benzene. The trend has been toward the use of a fluidized reaction mass comprising copper chlorides supported on finely divided inert carriers. Such a process is typified by the teachings of British Patent No. 587,969.

It must be recognized, however, that a fluidized reaction mass is necessarily of uniform composition throughout each reaction zone and that the use of such a mass, where the reagents normally pass through several stages, results necessarily in average or compromise conditions rather than optimum reaction conditions. If it is considered that the copper chlorides employed in an oxychlorination of hydrocarbons are true reagents rather than catalysts, it becomes apparent that close attention must be paid to provide the optimum reaction conditions for the preparation in turn of each of the various chlorides involved in the following typical reactions:

$$Cu_2Cl_2 + \tfrac{1}{2} O_2 \rightarrow CuO \cdot CuCl_2 \quad (1)$$
$$CuO \cdot CuCl_2 + 2HCl \rightarrow 2CuCl_2 + H_2O \quad (2)$$
$$2CuCl_2 + RH \rightarrow RCl + Cu_2Cl_2 + HCl \quad (3)$$

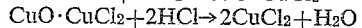

It is recognized that each of these reactions has different thermal requirements and characteristics from each of the others. Despite such recognition, proposals have been made to combine Reactions 1 and 2 above, giving rise to the following equation:

$$Cu_2Cl_2 + \tfrac{1}{2} O_2 + 2HCl \rightarrow 2CuCl_2 + H_2O \quad (4)$$

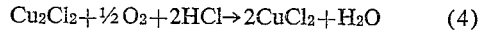

Similarly it has been proposed to combine, in a single reaction zone, Equations 2 and 3 above, the result of which is $$CuO \cdot CuCl_2 + HCl + RH \rightarrow Cu_2Cl_2 + RCl + H_2O \quad (5)$$

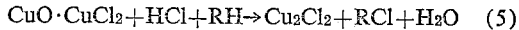

The disadvantage of a system employing Equation 4 as its sole source of cupric chloride resides largely in the dilution effect which the mixture of oxygen and hydrogen chloride exert upon one another. The desirable mass action, either for the formation of cupric oxychloride as in Equation 1, or for the production of cupric chloride as in Equation 2, cannot occur. Many of the chlorinated hydrocarbons, which it is desired to produce by an oxychlorination procedure, are readily hydrolyzed by water at high temperatures while the same compounds, or the hydrocarbons from which they are made, are oxidized to carbon dioxide by such agents as cupric oxychloride or oxygen at high temperatures. For these reasons the combination represented by Equation 5 is disadvantageous, if it is the sole reaction for the chlorination of the hydrocarbon.

To carry out the reaction represented by Equation 3, there should be present a maximum of cupric chloride, to promote the chlorination, and a minimum of cupric oxychloride in the chlorination zone at chlorination temperature, to prevent undesired oxidation. At the same time, Reaction 2 requires that an adequate supply of cupric oxychloride be available where needed to insure high efficiency in converting hydrogen chloride to chlorine in the form of the chlorination agent, cupric chloride. These two requirements are inconsistent with one another if it is attempted to carry out both reactions in a single reaction zone, and optimum conditions for both reactions are unobtainable in a well mixed solid phase such as is present in a fluidized reaction system. To prevent the cupric chloride from losing chlorine, as such, to the effluent gases, the reaction mass in the oxidizing section of an oxychlorination system should contain a high concentration of cuprous chloride which can absorb any chlorine that is liberated. Since cuprous chloride is useless as a chlorinating agent, any attempt to transfer a reaction mass containing large amounts of this material from the oxidation section to the chlorination section of the system would defeat the ultimate purpose. It is apparent that it is similarly impractical to transfer high values of cupric chloride from the chlorination bed to the oxidation bed, since this will result in loss of chlorine during oxidation.

It is desired to avoid the unsatisfactory and compromise conditions prevailing in the reaction zones described in the prior art. To this end, it is an object of the present invention to provide a method whereby hydrocarbons and their partially chlorinated substitution products may be chlorinated efficiently in the presence of reaction masses comprising the chlorides of copper, and under conditions to minimize hydrolysis of the product, oxidation of the hydrocarbon, and loss of chlorine values. A related object is to provide such a method in which the degree of conversion of hydrogen chloride is so great, in a single pass through the reaction system, that recycling of chlorine values is unnecessary. Related objects may appear hereinafter.

The present invention is based upon the discovery that the foregoing objects may be attained and that the disadvantages inherent in the prior art processes may be avoided by a particular type of controlled reaction between the hydrocarbon and the chlorides of copper under such conditions that each stage in the reaction is effected at the optimum temperature and with the optimum ratio of reagents.

The process of the present invention will be described and may be understood by reference to the accompanying drawings, each of which is a flow diagram, illustrating one form of the reaction system preferred for use in the invention.

The apparatus employed in carrying out the method of the invention consists essentially of four chambers, or reaction zones, in series, through which the solid reaction mass flows, by gravity, countercurrent to the gaseous or vaporized reagents. Referring to Fig. 1, cuprous chloride, in the form of an impregnant on a siliceous carrier, is fed into the top of the uppermost chamber 10 wherein it is converted, by the action of a controlled amount of air, to a mixture of cuprous chloride and cupric oxychloride. This is an exothermic reacttion, and under preferred conditions for many common chlorination reactions, the material entering chamber 10 is at a temperature near 250° to 280° C. while the partially oxidized solid reaction mass leaves chamber 10 at a temperature near 320° C. As the solid reaction mass moves downward, it enters chamber 11 where it meets and reacts with a mixture of hydrogen chloride and hydrocarbon, containing some chlorinated hydrocarbon. The cupric oxychloride in the solid reaction mass at the upper levels in chamber 11 insures the complete absorption of the hydrogen chloride from this gaseous mixture, yet the temperature is low enough to minimize destructive oxidation of the organic compounds. Upon reaction with hydrogen chloride, the cupric oxychloride is converted to cupric chloride in an exothermic reaction. The solid mass becomes heated to a temperature near 350° C. where the cupric chloride may act as a chlorinating agent for the relatively small amount of hydrocarbon in the gas being fed to, and passed through, chamber 11. The exit gases from chamber 11 consist of chlorinated hydrocarbon, water, and traces of unreacted hydrocarbon. From chamber 11 the solid reaction mass, now consisting of cuprous chloride and cupric chloride, flows by gravity at the temperature near 350° C. into chamber 12. In this zone the copper compounds move countercurrent to a gaseous mixture of hydrogen chloride and the rest of the air needed to convert the copper compounds to the bivalent condition, and the heat liberated by these reactions raises the temperature of the solid reaction mass, often to about 400° C. or higher. The exit gas from this chamber 12 is essentially a mixture of nitrogen and water vapor. When the solid reaction mass has reached the bottom of chamber 12, the copper compound present is essentially cupric chloride, which flows at the same steady rate into the lowermost chamber 13, where it is brought into contact with a stream of the hydrocarbon which it is desired to chlorinate. When this hydrocarbon is methane or ethane, reaction temperatures of 350° to 450° C. are preferred, and the chlorination reaction is slightly endothermic so that a natural drop in the temperature of the copper chloride mass may be expected. In any event, the temperature in this zone may be caused to decrease by controlling the rate at which the solid reaction mass is circulated as well as by regulation of the temperature of the solid reaction mass being fed to chamber 10. In chamber 13 cupric chloride gives up chlorine to the hydrocarbon and is thereby reduced to cuprous chloride. The exit gases from chamber 13 from the mixture of hydrogen chloride, unconverted hydrocarbon and chlorinated hydrocarbon which constitutes the feed to chamber 11 as mentioned above. Cuprous chloride, reaching the bottom of chamber 13, flows therefrom at a temperature which may be near 400° C., and is conveyed by any suitable means, such as an air lift or a bucket conveyor, to the top of the reaction tower where it is re-introduced at the top of chamber 10. In an air lift, the solid reaction mass is cooled to the desired initial temperature in chamber 10, by the cooling effect of air alone or by a combination of air-cooling and the cooling effect of a surrounding water-jacket, if desired. All the heat of reaction is removed from the solid mass in the lift.

It should be understood that there are two points in the system at which it is desirable to have a specific temperature and that the required temperatures differ according to the material being chlorinated. One critical point is the temperature of the solid reaction mass entering the chlorination chamber 13. When the rate of flow of hydrocarbon through chamber 13 is adjusted to effect substantially complete reduction of cupric to cuprous chloride, the exit temperature of the latter material depends upon the heat of reaction, the specific heat of the reaction mass, and related factors. The other important control point is in chamber 11, where the cupric oxychloride-cuprous chloride mixture at the top and the cupric chloride-cuprous chloride mixture at the bottom must not be so hot as to oxidize or chlorinate significant amounts of the hydrocarbon and chlorohydrocarbons passing therethrough but must react to strip remaining hydrogen chloride from the gas stream. Because of the differences which exist between the actual temperature at the bottom of chamber 13 and the desired temperature in chamber 11, the temperature of the cuprous chloride being recirculated to chamber 10 may be varied by greater or smaller amounts of cooling in the air lift, as previously suggested. Since the oxidation of cuprous chloride to cupric oxychloride in chamber 10 is exothermic, the temperature of the cuprous chloride entering that zone must be enough below the required temperature in chamber 11 to provide a factor of safety in over-all operations. The temperature rise in a given system may be adjusted to the convenience of the intended reaction by changes in the amount of copper salts on a given weight of carrier, or by changes in the rate of circulation of the reagents. Thus, a higher copper burden will favor greater temperature rises, as will decreased circulation rates, while less copper or higher circulation rates are reflected by lower temperature gradients. Because of the protective or diluent effect of the cuprous chloride in the solid mass passing through chamber 11 in the present system, somewhat higher temperatures may be used in that zone than are considered safe if the cuprous chloride has all been oxidized to oxychloride in chamber 10, and the temperature rise in chamber 12, due to the oxidation of the cuprous chloride which has passed through chamber 11, and its conversion to cupric chloride, is sufficient to provide the required chlorination temperature in chamber 13.

Reference has been made in the foregoing description to a "solid reaction mass." In the method of operation employed in the present invention, the copper salts constituting the solid reagent are deposited on and throughout the pores of a particular type of carrier having a particle size mainly in the range which will pass through a 6 mesh sieve and rest on a 20 mesh sieve (U. S. sieve series). Such impregnated particles are small enough to flow readily by their own weight yet are large enough to resist any tendency of the countercurrent gas streams to cause turbulence in the reaction chambers at practical reaction velocities. The preferred carrier is a diatomaceous earth, though porous clay or other inactive aluminous or argillaceous carriers may be used if they have the required inertness, porosity and resistance to loss by attrition. The requirements for a satisfactory carrier include chemical inertness under the contemplated reaction conditions and certain relations between pore volume, pore diameter and suface area. It has been found that the most desirable carriers have a total pore volume of at least 0.5 cc. per gram, and that at least 80 per cent of this volume is in the form of macropores. The surface area is at least 1 square meter per gram, and the ratio of volume to surface (computed as radius of an assumed uniform circular cylinder having the total pore surface and total pore volume) is at least 1800 Angstroms. The carrier should also be resistant to losses by attrition during circulation through the system.

A satisfactory test for a carrier's degree of resistance to attrition consists in circulating a body of catalyst-impregnated particles of the carrier down through a small tower, by gravity, thence up an air lift to a cyclone dust separator and back through the gravity leg, at a constant rate and preferably at a temperature between 350° and 450° C. (though this is not too important in the test) for periods of 8 hours or more, and then emptying the test apparatus and screening the solids to determine the amount of "fines" which has been formed. The lower this value, the greater is the resistance to loss by attrition, and in an 8-hour test an amount of fines under 5 per cent is desirable. In the slower rates of circulation used in actual practice, a much lower attrition loss is experienced.

An especially desirable species of carrier is a permeable and porous form of diatomaceous earth sold by the Johns-Manville Corporation under the trade designation "C–22 brick." The pores in this material are of a diameter greater than the mean-free path of any of the reagent gases so that when impregnated with the copper reagents, the effective surface is of much greater area than is represented merely by the external and roughly spherical surfaces of the carrier particles. When attempts are made to use some of the other presumably inert carriers, such as pumice, silica gel or activated alumina, each is found to be unsatisfactory for one reason or another. Thus, silica gel and activated alumina tend to promote destructive oxidation of the hydrocarbon to carbon dioxide, and pumice hinders oxidation of cuprous chloride to cupric oxychloride.

It is observed from the foregoing description that there exists in each of the successive reaction chambers, a specific temperature gradient appropriate to the reaction being conducted in that chamber. It is noted, also, that a corresponding composition gradient exists in the solid reaction mass present in each chamber. There is no necessity for the existence of compromise conditions or of any condition other than the optimum for the particular stage of the reaction carried out in each zone.

An advantage of the process as described with respect to Fig. 1 lies not only in the complete control of temperatures appropriate to the reactions at each stage, but also in the completeness with which the hydrogen chloride may be utilized in the oxychlorination reaction. The relative rates of flow of hydrocarbon feed to chamber 13, and of the cupric chloride reagent downwardly through that chamber are so adjusted that the cupric chloride is reduced substantially completely to cuprous chloride. When this is recycled to chamber 10, its temperature is reduced in the manner previously described. The exit gases from chamber 13 contain not only the expected chlorinated hydrocarbon and hydrogen chloride but also a certain amount of unconverted hydrocarbon. When this mixture is fed into chamber 11, it encounters enough cupric oxychloride to recover the chlorine values from the hydrogen chloride generated in chamber 13. The temperature in chamber 11 is below the optimum value for substantial reaction between the cupric chloride and hydrocarbon. The amount of air fed to chamber 10 is controlled so as not to convert all of the cuprous chloride to cupric oxychloride. Conveniently, about half of the over-all air requirements are supplied at this point. This provides the desired mixture of copper compounds for carrying out the final treatment of the hydrocarbon in chamber 11 as just described. The cuprous chloride which passes through the system and enters chamber 12 along with cupric chloride from chamber 11 is both oxidized to cupric oxychloride and converted to cupric chloride by the successive or combined effects of air and hydrogen chloride in chamber 12. The water vapor resulting from the oxidation of hydrogen chloride in chamber 12 passes out of the system without coming in contact with any chlorinated hydrocarbon. Hence, the only point in the system at which a chlorinated hydrocarbon product is simultaneously in contact with an oxidizing and a hydrolyzing agent is in chamber 11, and in this chamber the relatively small amount of cupric oxychloride at the top of the chamber, combined with the moderate temperatures prevailing, and the dilution in which water vapor exists in the gas stream emerging from that zone, minimizes the injurious effects which such agents have had upon the yields of the chlorinated hydrocarbons in other proposed oxychlorination systems.

A modification of the reaction system described above is shown in Fig. 2 where it is proposed to feed hydrogen chloride into the bottom of chamber 12 while feeding air into that chamber at an intermediate level. This arrangement defines more clearly the successive steps for converting the cuprous chloride into cupric oxychloride and the latter into cupric chloride, and minimizes the dilution effect encountered when the reagents are introduced at the same level. Yet another variation of this arrangement is illustrated in Fig. 3 in which the third principal reaction zone is illustrated as being divided between two compartments designated 12A and 12B, in the upper of which the cuprous chloride is converted by means of air to cupric oxychloride and in the lower of which the cupric oxychloride is changed to cupric chloride.

It should be understood that the drawings, to which reference has been made, are diagrammatic, and that, in practice, reagent gases are not fed to the reaction zones merely through openings in the walls of the respective chambers, but that efficient gas distribution may be had in each chamber through the use of a perforated distributor ring, as is well-known in the art.

The materials of which the reaction vessels may be constructed are limited because of the corrosive character of the solid and gaseous reagents and the temperatures employed. Nickel may be used as the internal surface of the reaction vessels, and various types of non-porous ceramic materials are satisfactory. Sometimes nickel is used in those parts of the system in which the copper is present mostly as oxychloride, while ceramics are used where the copper mass is mainly cupric chloride.

The foregoing description has referred to the solid reaction mass as containing cuprous chloride, cupric chloride or cupric oxychloride at appropriate points in the system. It is to be understood that other materials may be present in addition to the named compounds of copper. Thus, it is often of advantage to mix a promoter or activator with the copper compounds carried on the siliceous support, to increase the efficiency or the rate of the chlorination reaction. Such promoters, which form no part of the present invention, may be the chlorides of other metals, such as potassium chloride, though it is to be understood that other types of promoters may be present when carrying out the present process.

When preparing to operate the method of the present invention, the inert carrier is screened to select for use the particles of the desired particle size. An amount of such particles is taken which will be sufficient to fill the apparatus to be used, and the carrier is wet with an aqueous solution of cupric chloride of a concentration to provide the desired copper burden on the carrier. When using the crushed "C–22" type of diatomaceous earth, having a density of about 360 grams per liter in the form of 6 to 20 mesh particles, it is convenient to employ 380 cc. of a cupric chloride solution containing 3.35 mols of copper salt per liter, for each liter of the carrier. When the carrier and copper chloride solution are stirred together, the resulting impregnated mass appears only slightly wet. It is then dried, suitably while maintained in the fluidized state in a strong air blast. The temperature of the air used for drying is gradually increased until the temperature of the dried mass reaches 250° C. The so-dried particles are used to fill the reaction system, and heat is applied in the chlorination zone (chamber 13) until the mass is at a reaction temperature, and the mass is then circulated slowly through the system, as described. Air and hydrogen chloride are introduced at the proper points, and hydrocarbon is fed to the chlorination zone. Balanced operating conditions are reached as soon as the entire charge of the solid reaction mass has passed once through the cyclic system.

The following examples illustrate the practice of the invention as applied to the chlorination of a variety of hydrocarbon feeds, but such examples are not to be construed as limiting the invention.

*Example 1*

Methane was chlorinated in the manner described above, using a moving bed of a solid reaction mass, originally consisting essentially of the "C–22" carrier of 6 to 20 mesh particle size, burdened with an equal weight of an equimolar mixture of cupric chloride and sodium chloride. The rate of flow of methane was adjusted to provide a contact time of 57 seconds between the methane and the cupric chloride in chamber 13, at an average temperature in that zone of 417° C. It was found that 40 to 50 per cent of the methane was chlorinated in a single pass through the system, and that a typical analysis of the chlorinated products was:

| Compound: | Mol percent |
|---|---|
| Methyl chloride | 27–32 |
| Methylene chloride | 33–50 |
| Chloroform | 28–15 |
| Carbon tetrachloride | 12–3 |

The efficiency of the system in absorbing and utilizing hydrogen chloride was consistently near 100 per cent.

*Example 2*

In a manner similar to that described in Example 1, methane was chlorinated at 413° C. over a solid reaction mass consisting of 0.5 mol chromic chloride per mol of cupric chloride, supported on an equal weight of the "C–22" carrier. A little over one mol of hydrogen chloride was fed to chamber 12 for each mol of methane fed to chamber 13. The hydrogen chloride was entirely consumed in the reaction, and 48 per cent of the methane was converted to chlorinated products, whose analysis was:

| Compound: | Mol percent |
|---|---|
| Methyl chloride | 15 |
| Methylene chloride | 58 |
| Chloroform | 19 |
| Carbon tetrachloride | 8 |

*Example 3*

Ethane was fed to chamber 13 while hydrogen chloride was introduced into chamber 12 at a ratio of 2 mols of HCl per mol of ethane. Various rates of feed were used, to provide the different contact times shown in the table, below, between the hydrocarbon and the cupric chloride-containing solid reaction mass. Average reaction temperature in the chlorination zone, as shown, was near 390°–395° C., and the amount of ethane chlorinated per pass varied directly with the contact time. All hydrogen chloride was absorbed in chambers 11 and 12, and the exit gases from the system were substantially free from this reagent. Typical analyses of the chlorinated products, obtained under typical reaction conditions, are listed below:

| | | |
|---|---|---|
| Average temperature of cupric chloride, °C | 394 | 391 |
| Contact time between ethane and cupric chloride, seconds | 19 | 38 |
| Conversion of ethane to chlorinated products, per pass, percent | 39 | 52 |
| Product analysis, mol percent: | | |
| Dichloroethylenes | 19 | 21 |
| Ethylene chloride | 23 | 16 |
| Trichloroethylene | 9 | 9 |
| Trichloroethane | 3 | 3 |
| Perchloroethylene | 19 | 23 |
| sym. Tetrachloroethane | 26 | 28 |
| Pentachloroethane | 0 | 0 |

The method of the invention may be used as well in the chlorination of ethylene, the chlorinated aliphatic hydrocarbons having replaceable hydrogen atoms or chlorine receptive double bonds, benzene, toluene and many other such compounds commonly subjected to chlorination reactions.

In none of the reactions carried out in the herein-described manner has any significant or objectionable amount of hydrolysis of the chlorinated products been observed, and the moderate temperatures as well as the relative dilution of the reagents in the oxychloride zone (chamber 11) has been found to cause a minimum of oxidation of those products, and recoveries of 93 to 98 per cent of the carbon values are normal.

What is claimed is:

1. The method which comprises establishing a moving bed of a solid reaction mass comprising an inert carrier and a chloride of copper, moving the entire said bed at a substantially uniform rate successively through a zone in which a part of the cuprous chloride is oxidized to cupric oxychloride by reaction with a gas containing free oxygen, thence through another zone in which the cupric oxychloride portion of the reaction mass reacts with hydrogen chloride and is converted to cupric chloride, thence through another zone in which the remaining cuprous chloride portion of the reaction mass reacts with oxygen and hydrogen chloride and is thereby converted to cupric chloride, the temperature of the solid reaction mass being increased in each said zone due to the exothermic reaction therein, then moving the supported cupric chloride mass through a final zone in which it reacts with a volatile and chlorinatable feed material and is reduced to cuprous chloride, and finally returning the solid reaction mass at the same substantially uniform rate to the first said zone at a reduced temperature, while passing countercurrent to portions of said moving bed the chlorinatable feed introduced into the last said zone and initially consisting of a material selected from the group consisting of the readily volatile hydrocarbons and their volatile and less than fully chlorinated chlorine reaction products, at a rate to avoid solids turbulence in the reaction zones and to reduce the cupric chloride in the last and hottest zone to cuprous chloride, the reaction products from said hottest zone being conveyed thence and introduced in countercurrent flow to the zone wherein said mass contains a mixture of cuprous chloride and cupric oxychloride; recovering chlorinated hydrocarbon from the effluent from said zone; and, between the two zones employed for contact between the hydrocarbon and the solid reaction mass, causing hydrogen chloride and a gas containing free oxygen to flow countercurrent to said mass, converting the copper values therein substantially completely to cupric chloride.

2. The method which comprises establishing a moving bed of a solid reaction mass comprising an inert carrier and a chloride of copper, said carrier having an average particle size of at least 20 mesh, a total pore volume of at least 0.5 cubic centimeter per gram, at least 80 per cent of the pore volume being macropores, a surface area of at least 1 square meter per gram, and having a ratio of pore volume to surface area, expressed as the radius of an assumed uniform circular cylinder having the total pore volume and total pore surface, of at least 1800 Ångstroms; moving the entire said bed at a substantially uniform rate successively through a zone in which a part of the cuprous chloride is oxidized to cupric oxychloride by reaction with a gas containing free oxygen, thence through another zone in which the cupric oxychloride portion of the reaction mass reacts with hydrogen chloride and is converted to cupric chloride, thence through another zone in which the remaining cuprous chloride portion of the reaction mass reacts with oxygen and hydrogen chloride and is thereby converted to cupric chloride, the temperature of the solid reaction mass being increased in each said zone due to the exothermic reaction therein, then moving the supported cupric chloride mass through a final zone in which it reacts with a volatile and chlorinatable feed material and is reduced to cuprous chloride, and finally returning the solid reaction mass at the same substantially uniform rate to the first said zone at a reduced temperature, while passing countercurrent to portions of said moving bed the chlorinatable feed introduced into the last said zone and initially consisting of a material selected from the group consisting of the readily volatile hydrocarbons and their volatile and less than fully chlorinated chlorine reaction products, at a rate to avoid solids turbulence in the reaction zones and to reduce the cupric chloride in the last and hottest zone to cuprous chloride, the reaction products from said hottest zone being conveyed thence and introduced in countercurrent flow to the zone wherein said mass contains a mixture of cuprous chloride and cupric oxychloride; recovering chlorinated hydrocarbon from the effluent from said zone; and, between the two zones employed for contact between the hydrocarbon and the solid reaction mass, causing hydrogen chloride and a gas containing free oxygen to flow countercurrent to said mass, converting the copper values therein substantially completely to cupric chloride.

3. The method which comprises establishing a moving bed of a solid reaction mass comprising a diatomaceous earth as an inert carrier and a chloride of copper, said carrier having an average particle size of at least 20 mesh, a total pore volume of at least 0.5 cubic centimeter per gram, at least 80 per cent of the pore volume being macropores, a surface area of at least 1 square meter per gram, and having a ratio of pore volume to surface area, expressed as the radius of an assumed uniform circular cylinder having the total pore volume and total pore surface, of at least 1800 Ångstroms; moving the entire said bed at a substantially uniform rate successively through a zone in which a part of the cuprous chloride is oxidized to cupric oxychloride by reaction with a gas containing free oxygen, thence through another zone in which the cupric oxychloride portion of the reaction mass reacts with hydrogen chloride and is converted to cupric chloride, thence through another zone in which the remaining cuprous chloride portion of the reaction mass reacts with oxygen and hydrogen chloride and is thereby converted to cupric chloride, the temperature of the solid reaction mass being increased in each said zone due to the exothermic reaction therein, then moving the supported cupric chloride mass through a final zone in which it reacts with a volatile and chlorinatable feed material and is reduced to cuprous chloride, and finally returning the solid reaction mass at the same substantially uniform rate to the first said zone at a reduced temperature, while passing countercurrent to portions of said moving bed the chlorinatable feed introduced into the last said zone and initially consisting of a material selected from the group consisting of the readily volatile hydrocarbons and their volatile and less than fully chlorinated chlorine reaction products, at a rate to avoid solids turbulence in the reaction zones and to reduce the cupric chloride in the last and hottest zone to cuprous chloride, the reaction products from said hottest zone being conveyed thence and introduced in countercurrent flow to the zone wherein said mass contains a mixture of cuprous chloride and cupric oxychloride; recovering chlorinated hydrocarbon from the effluent from said zone; and, between the two zones employed for contact between the hydrocarbon and the solid reaction mass, causing hydrogen chloride and a gas containing free oxygen to flow countercurrent to said mass, converting the copper values therein substantially completely to cupric chloride.

4. The method which comprises establishing a moving bed of a solid reaction mass comprising a diatomaceous earth as an inert carrier and a chloride of copper, said carrier having an average particle size of at least 20 mesh, a total pore volume of at least 0.5 cubic centimeter per gram, at least 80 per cent of the pore volume being macropores, a surface area of at least 1 square meter per gram, and having a ratio of pore volume to surface area, expressed as the radius of an assumed uniform circular cylinder having the total pore volume and total pore surface, of at least 1800 Ångstroms; moving the entire said bed at a substantially uniform rate successively through a zone in which a part of the cuprous chloride is oxidized to cupric oxychloride by reaction with a gas containing free oxygen, thence through another zone in which the cupric oxychloride portion of the reaction mass reacts with hydrogen chloride and is converted to cupric chloride, thence through another zone in which the remaining cuprous chloride portion of the reaction mass reacts with oxygen and hydrogen chloride and is thereby converted to cupric chloride, the temperature of the solid reaction mass being increased in each said zone due to the exothermic reaction therein, then moving the supported cupric chloride mass through a final zone in which it reacts with a volatile and chlorinatable feed material and is reduced to cuprous chloride, and finally returning the solid reaction mass at the same substantially uniform rate to the first said zone at a reduced temperature, while passing a volatile hydrocarbon countercurrent to portions of said bed at a rate to avoid solids turbulence in the reaction zones and to reduce the cupric chloride in the last and hottest zone to cuprous chloride, the reaction products from said hottest zone being conveyed thence and introduced in countercurrent flow to the zone wherein said mass contains a mixture of cuprous chloride and cupric oxychloride; recovering chlorinated hydrocarbon from the effluent from said zone; and, between the two zones employed for contact between the hydrocarbon and the solid reaction mass, causing hydrogen chloride and a gas containing free oxygen to flow countercurrent to said mass, converting the copper values therein substantially completely to cupric chloride.

5. The method as claimed in claim 4, wherein the hydrocarbon subjected to oxychlorination is methane.

6. The method as claimed in claim 4, wherein the hydrocarbon subjected to oxychlorination is ethane.

References Cited in the file of this patent

UNITED STATES PATENTS

| | | |
|---|---|---|
| 2,407,828 | Gorin | Sept. 17, 1946 |
| 2,498,546 | Gorin | Feb. 21, 1950 |
| 2,575,167 | Fontana et al. | Nov. 13, 1951 |

FOREIGN PATENTS

| | | |
|---|---|---|
| 214,293 | Great Britain | Apr. 14, 1924 |
| 559,080 | Great Britain | Feb. 3, 1949 |
| 587,969 | Great Britain | May 9, 1947 |